United States Patent [19]
Dollhausen et al.

[11] 4,180,638
[45] Dec. 25, 1979

[54] STORABLE POLYCHLOROPRENE ADHESIVES AND A PROCESS FOR THEIR PRODUCTION EMPLOYING XANTHOGEN DISULPHIDES

[75] Inventors: Manfred Dollhausen, Odenthal; Gerhard Hohmann, Leverkusen; Winfried Behr, Duesseldorf, all of Fed. Rep. of Germany

[73] Assignee: Bayer Aktiengesellschaft, Fed. Rep. of Germany

[21] Appl. No.: 736,308

[22] Filed: Oct. 28, 1976

[30] Foreign Application Priority Data

Nov. 3, 1975 [DE] Fed. Rep. of Germany ....... 2549150

[51] Int. Cl.² .......................... C08F 2/38; C08F 4/40; C08F 136/18; C08J 3/08
[52] U.S. Cl. .......... 526/204; 260/31.2 R; 260/33.6 A; 260/33.8 UA; 260/34.2; 526/223; 526/295
[58] Field of Search ....... 526/223, 204, 295, 31.2 MR; 260/33.6 UA, 33.8 UA, 33.6 A

[56] References Cited

U.S. PATENT DOCUMENTS

| | | | |
|---|---|---|---|
| 3,875,201 | 4/1975 | Mayer-Mader et al. ............ | 260/901 |
| 3,954,916 | 5/1976 | Mayer-Mader et al. ............ | 526/223 |

*Primary Examiner*—Herbert J. Lilling
*Attorney, Agent, or Firm*—Connolly and Hutz

[57] ABSTRACT

Storable polychloroprene adhesives can be produced by polymerizing chloroprene in a manner known per se in the presence of a dialkylxanthogen disulphide reacting 50 to 90% of the monomer and dissolving the polymer thus obtained in an organic solvent to obtain viscosities in the range of 10 to 100 poises.

8 Claims, No Drawings

STORABLE POLYCHLOROPRENE ADHESIVES AND A PROCESS FOR THEIR PRODUCTION EMPLOYING XANTHOGEN DISULPHIDES

The use of polychloroprene for the production of adhesives is described in U.S. Pat. Nos. 2,610,910 and 2,918,442.

According to the prior art, the polychloroprene used for the production of adhesives of this type is produced by emulsion polymerisation processes in which the sodium salts of disproportionated resinic acids together with condensation products of formaldehyde and naphthalene sulphonic acids are used as emulsifiers. The pH of the emulsions is adjusted to an alkaline value before polymerisation. Mercaptans are used for regulating molecular weight.

If, in the production of adhesives, the polychloroprene thus produced is immediately dissolved, a change in the flow properties of the adhesives, in particular an increase in their solution viscosity, gradually occurs during storage, making the adhesives very difficult to process. This deterioration in processibility is reflected in particular in poorer spreadability and sprayability of the adhesives and in adverse behaviour in machine application. In order to obviate these disadvantages, the polychloroprene may be masticated before dissolution. However, mastication is very time-consuming and gives rise to high processing costs.

It has now been found that, by using dialkyl xanthogen disulphides for regulating polymerisation, polychloroprene can be produced in such a way that, when dissolved without previous mastication, it gives adhesives which do not have any of the rheological disadvantages referred to above.

Accordingly, the invention relates to a process for the production of polychloroprene, for use as a starting material in the production of adhesives, in which dialkyl xanthogen disulphides are used as molecular weight regulators.

The invention also relates to the adhesives produced from this polychloroprene.

The dialkyl xanthogen disulphides used in accordance with the invention correspond to the following formula (I):

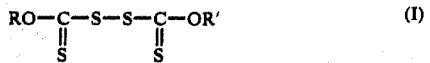

in which

R and R' are the same or different and represent an alkyl radical having 1 to 4 carbon atoms or stand for the following formulae:
R' and

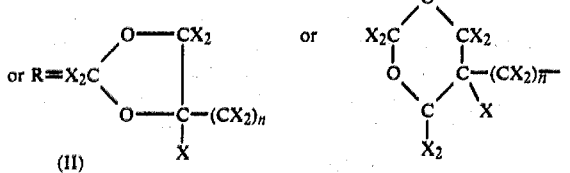

in which

X represents hydrogen, an alkyl radical having 1 to 6 carbon atoms, phenyl, naphthyl, benzyl, chlorine, bromine, iodine and n is a number from 1 to 20.

It is preferred to use dialkyl xanthogen disulphides in which R and/or R' represents an alkyl radical having 1 to 4 carbon atoms or formula (II) or (III), where the radical X represents hydrogen or an alkyl radical having 1 to 6 carbon atoms.

Compounds in which the two radicals R and R' are identical are particularly preferred.

The production of the compounds is known from DT-OS 2,306,610 and 2,352,937. An alcohol of the formula ROH, in which R is as already defined above, is reacted with carbon disulphide in the presence of a strong alkali to form the corresponding alkali xanthogenate which is then oxidised to form the xanthogen disulphide.

The process is generally carried out as follows:

Substantially equimolar quantities of an alcohol ROH (R is as defined above) are added to an aqueous solution of a strong alkali, for example to a 20 to 50% by weight aqueous potassium or sodium hydroxide solution. Carbon disulphide is then slowly added to this mixture. Once again, an equimolar quantity or an excess may be used. During the exothermic reaction, which begins immediately, the xanthogenate is initially formed. During this reaction the mixture is cooled in such a way that the reaction temperature does not exceed 50° C.

The aqueous xanthogenate solution obtained is then oxidised into the xanthogen disulphide by the addition of a suitable oxidising agent, such as hydrogen peroxide or potassium peroxy disulphate (in the form of an aqueous solution). The water-insoluble xanthogen disulphide precipitates. It is separated from the aqueous phase, for example, by filtration or decantation, and dried.

This process is carried out similarly to the process for producing dialkyl xanthogen disulphides which is described, for example, in Kirk-Othmer, Encyclopedia of Chemical Technology, 2nd Edition, Vol. 22 (1070), pages 419–429, and in Ullmann, Encyclopedia der Techn. Chemie, Vol. 18 (1967), page 718 to 728.

The polymerisation of chloroprene is described, for example, in U.S. Pat. Nos. 2,394,291 and 2,567,117; in British Patent Specifications Nos. 512,458 and 1,094,321; and in German Offenlegungsschrift No. 2,241,394.

It is carried out in aqueous-alkaline emulsion in the presence of radical initiators at temperatures of from 0° C. to 70° C. in the presence of emulsifier systems containing alkali metal salts of disproportionated resinic acid condensation products of naphthalene sulphonic acids and formaldehyde.

The sodium or potassium salts are mentioned as examples of alkali metal salts of disproportionated resinic acid. The disproportionated resinic acids themselves and their production are described in U.S. Pat. Nos. 2,154,629 and 2,201,237. They are obtained, for example, by disproportionating wood resins such as, for example, colophony. The alkali salts may be added in quantities of from 2 to 10 parts by weight, and preferably in quantities of from 3 to 5 parts by weight, per 100 parts by weight of the monomer.

The condensation products of naphthalene sulphonic acid and formaldehyde are described in U.S. Pat. No. 1,191,480.

The emulsifiers are used in quantities sufficient to guarantee a surface-active effect. The appropriate quantities may readily be determined by any expert. It is regarded as particularly favourable to use the emulsifiers in quantities of from 0.4 to 1.5 parts by weight per 100 parts by weight of the monomer.

The dialkyl xanthogen disulphides are added in quantities of from 0.1 to 5.0 parts by weight, and preferably in quantities of from 0.2 to 1.0 part by weight, per 100 parts by weight of the monomer.

The polymerisation reaction is carried out in known manner in emulsion, either continuously or in batches.

The polymerisation initiators used are the known compounds producing free radicals such as, for example, potassium peroxy disulphate, hydrogen peroxide, water-soluble salts of persulphuric acid, organic peroxides (e.g. p-menthane hydroperoxide, benxoyl peroxide, lauryl peroxide or tert.-butyl hydroperoxide). It is particularly advantageous to use formamidine sulphinic acid in accordance with German Auslegeschrift No. 1,097,689.

The polymerisation reaction may be carried out at temperatures in the range of from 0° to 70° C., although it is preferably carried out at temperatures in the range of from 8° to 45° C.

The use of the described emulsifier systems requires pH-values of the emulsion of greater than 10, a pH-range of from 12.0 to 13.5 being particularly favourable.

From 50 to 90% and preferably from 60 to 80% of the monomer used is reacted.

Unreacted organic compounds may be removed by steam distillation, for example at 50° C. under an absolute pressure of 20 Torr.

The alkaline latex which is formed during the polymerisation reaction is adjusted to pH 5–7 by the addition of, for example, dilute acetic acid and is thus sensitized.

As a result of this acidification, the emulsifiers lose their effect. The latex would coagulate uncontrollably if it did not contain another surface-active compound which imparts a certain stability to it. The condensation product of naphthalene sulphonic acid and formaldehyde in the form of an alkali metal salt is normally used for this purpose (cf. R. S. Barrows and G. W. Scott, Ind. Eng. Chem. 40, 2193 (1948).

Alkyl naphthalene sulphonates, for example diisopropyl or diisobutyl naphthalene sulphate, may be used equally successfully for stabilising the latex after acidification.

The latex stabilised with naphthalene sulphonates may be irreversibly coagulated on the surface of a rotating cooling cylinder.

The thawed, washed and mechanically press-dried sheet is then dried in a belt dryer by IR-radiation and/or hot air.

In the process according to the invention, chloroprene may be polymerised on its own or may be replaced by up to 50% by weight of another monomer copolymerisable with chloroprene such as, for example, monovinyl compounds (e.g. acrylonitrile, methacrylonitrile, vinylidene chloride, α-chloroacrylonitrile, methacrylic acid esters or acrylic acid esters) or vinyl-substituted aromatic compounds (e.g. 1,3-butadiene, 1-chloro-1,3-butadiene, 2,3-dichloro-1,3-butadiene or 2-chloro-3-methyl-1,3-butadiene).

To produce the adhesives, the polychloroprene obtained is dissolved in organic solvents, for example aromatic hydrocarbons, such as benzene or toluene, chlorinated hydrocarbons such as methylene chloride or trichlorethylene, or in mixtures of these solvents with other solvents which do not dissolve polychloroprene on their own, for example aliphatic hydrocarbons, such as petrol or cyclohexane, or esters, such as ethyl acetate or methyl acetate.

The viscosity of the adhesives may be adapted to the particular application envisaged. Viscosities of from 10 to 100 poises are preferred and viscosities in the range of from 15 to 50 poises are particularly preferred. Viscosity is measured at 20° C. with a Brookfield LVT viscosimeter. The polychloroprene content of the adhesives may vary. It is preferably in the range of from 10 to 30% by weight and, with particular preference, in the range of from 15 to 25% by weight.

In order to vary their properties, these adhesives may be modified with other suitable materials, for example natural or synthetic resins such as alkyl phenol resins, terpene phenol resins, coumarone and indene resins, colophony and modified colophony, also their esters, metal oxides such as magnesium oxide and zinc oxide, fillers such as silicates, and anti-agers such as 2,6-di-tert.-butyl-p-cresol or 2,2'-methylene-bis-(4-methyl-6-tert.-butyl phenol).

In addition, these adhesives may be used with polyisocyanates, such as triphenyl methane-4,4',4''-triisocyanate or thiophosphoric acid-tris-(p-isocyanatophenyl ester), as a crosslinking component.

The invention is illustrated by the following Examples which show that the adhesives based on polychloroprenes produced in the presence of dialkyl xanthogen disulphides have distinctly improved storage behaviour.

All parts and percentages are by weight unless otherwise indicated.

EXAMPLE 1

100 parts of chloroprene are mixed with 0.17 part of m-dodecyl mercaptan and the resulting mixture is emulsified in 150 parts of water in which 3 parts of the sodium salt of a disproportionated resinic acid, 0.8 part of the sodium salt of the condensation product of formaldehyde-naphthalene sulphonic acid and 0.8 part of sodium hydroxide have been dissolved. The temperature of the emulsion is reduced to 10° C. and the polymerisation reaction is initiated by the addition of a dilute aqueous potassium persulphate solution. The polymerisation temperature is kept at 10° C. and, after the monomer conversion has reached approximately 70%, the polymerisation reaction is stopped by the addition of a solution of phenothiazine in toluene. The excess monomer is removed under reduced pressure and, after the pH of the latex has been adjusted to 7.0, the polychloroprene is isolated by freezing out on a cooling cylinder. The material is found to have a Mooney value ML 4' of 95 in accordance with DIN 53523.

The polymerisation process described in Example 1 is used for comparison purposes and is outside the scope of the invention.

EXAMPLE 2

The procedure is as in Example 1 except that 0.4 part of bis-(1,3-dioxa-5-ethyl-5-methylene oxyxanthogen)-disulphide is used instead of the dodecyl mercaptan. The polymerisation reaction is terminated at a conversion of 69.2%. ML 4' of the material = 101.

EXAMPLE 3

The procedure is as in Example 1 except that 0.4 part of bis-(1,3-dioxa-5-ethyl-5-methylene oxyxanthogen)-disulphide is used instead of the dodecyl mercaptan.

Polymerisation is terminated at a monomer conversion of 70%. ML 4′=97.

EXAMPLE 4

The procedure is as in Example 1 except that 0.3 part of diethyl xanthogen disulphide is used instead of the dodecyl mercaptan. Polymerisation is terminated at a monomer conversion of 69.8%. ML 4′=105.

EXAMPLE 5

The procedure is as in Example 1 except that 0.35 part of diethyl xanthogen disulphide is used instead of the dodecyl mercaptan. Polymerisation is terminated at a monomer conversion of 70.6%. ML 4′=94.

EXAMPLE 6

170 g of each of the polychloroprenes produced in Examples 1 to 5 were dissolved while stirring with a laboratory stirrer (600 rpm) in 830 g of a solvent mixture of ethyl acetate, petrol 65/95 and toluene (ratio by weight 2:2:1). The adhesives thus obtained were diluted to a viscosity of 30 P, as measured at 20° C. with a Brookfield LVT viscosimeter (spindle 4, 30 rpm), by the addition of further quantities of the same solvent mixture, and stored in sealed containers at 20° C./65% relative air humidity. Their viscosity was remeasured after storage for 6 months.

| Polychloroprene according to Example No. | Solution viscosity (P)* | |
|---|---|---|
| | Immediately | After 6 months' storage |
| 1 | 30 | 84 |
| 2 | 30 | 30 |
| 3 | 30 | 31 |
| 4 | 30 | 32 |
| 5 | 30 | 31 |

*measured at 20° C. with a Brookfield LVT viscosimeter (spindle 4. 30 rpm).

We claim:

1. A process for producing a storable polychloroprene adhesive which comprises polymerizing 50 to 100 parts by weight of chloroprene monomer and 0 to 50 parts by weight of a monomer copolymerizable with chloroprene in an aqueous, alkaline emulsion in the presence of a radical initiator, an emulsifier containing an alkali metal salt of disproportionated resinic acid and a condensation product of a napthalene sulphonic acid and formaldehyde and a molecular weight regulator at a temperature of from 0° to 70° C., said molecular weight regulator being used in an amount of from 0.1 to 5.0 parts by weight per 100 parts by weight of a total monomer and being a dialkyl xanthogen disulphide of the formula

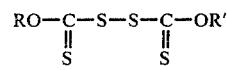

wherein R and R′ are the same or different and are alkyl having one to four carbon atoms or are

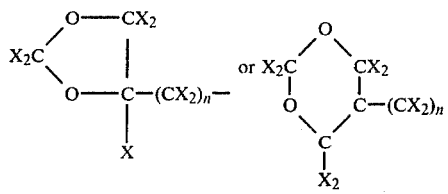

wherein each X is the same or different and is hydrogen, alkyl having one to six carbon atoms, phenyl, napthyl, benzyl, chlorine, bromine or iodine and n is from 1 to 20; discontinuing polymerization when 50 to 90% of total monomer is reacted and dissolving resultant polymer in sufficient organic solvent to obtain a polychloroprene adhesive having a viscosity of from 10 to 100 poises measured at 20° C. with a Brookfield LVT viscosimeter.

2. The process as claimed in claim 1, wherein R and R′ are alkyl having one to four carbon atoms and X is hydrogen or alkyl having one to six carbon atoms.

3. The process as claimed in claim 1, wherein the dialkyl xanthogen disulphide is used in an amount of from 0.2 to 1.0 parts by weight per 100 parts by weight of total monomer.

4. The process as claimed in claim 1, wherein the resulting polymer is dissolved in sufficient organic solvent to obtain a viscosity of from 15 to 50 poises.

5. The process as claimed in claim 1 wherein polymerization is discontinued when 60 to 80% of the total monomer is reacted.

6. A storable polychloroprene adhesive produced by the process as claimed in claim 1.

7. The storable polychloroprene adhesive of claim 6 having a polychloroprene content of from 10 to 30% by weight.

8. The storable polychloroprene adhesive of claim 6 having a polychloroprene content of from 15 to 25% by weight.

* * * * *